United States Patent
Crow et al.

[11] 3,961,769
[45] June 8, 1976

[54] ADJUSTABLE BEARING STRUCTURE FOR BUTTERFLY GATE VALVES

[75] Inventors: Harold E. Crow; Edward L. Brown, both of Middletown, Ohio

[73] Assignee: Armco Steel Corporation, Middletown, Ohio

[22] Filed: Apr. 9, 1973

[21] Appl. No.: 349,066

[52] U.S. Cl. ............................. 251/305; 251/307; 251/312; 251/214; 251/188
[51] Int. Cl.² ......................................... F16K 1/22
[58] Field of Search .......... 251/305, 306, 307, 308, 251/298, 304, 309, 312, 214, 215, 187, 188; 308/139, 161

[56] References Cited
UNITED STATES PATENTS

| | | | |
|---|---|---|---|
| 2,902,254 | 9/1959 | Conway et al. | 251/305 |
| 2,952,437 | 9/1960 | Knox | 251/302 X |
| 3,349,789 | 10/1967 | Crain et al. | 251/196 X |
| 3,384,337 | 5/1968 | Brown | 251/214 X |
| 3,445,087 | 5/1969 | Priese et al. | 251/214 X |
| 3,477,690 | 11/1969 | Murota et al. | 251/305 X |
| 3,625,478 | 12/1971 | Killian | 251/188 X |
| 3,627,259 | 12/1971 | Williams | 251/188 X |
| 3,697,042 | 10/1972 | Killian | 251/308 X |

FOREIGN PATENTS OR APPLICATIONS

| | | | |
|---|---|---|---|
| 985,164 | 3/1965 | United Kingdom | 251/305 |
| 1,193,190 | 5/1970 | United Kingdom | 251/305 |

*Primary Examiner*—Charles J. Myhre
*Assistant Examiner*—Ira S. Lazarus
*Attorney, Agent, or Firm*—Melville, Strasser Foster & Hoffman

[57] ABSTRACT

A butterfly gate valve for control of water in treatment, waste water plants and the like, wherein the gate is mounted on a one-piece shaft. The lower end of the shaft rotates in a radial bearing, and a radial bearing and a thrust bearing are provided on the upper end of the shaft above the gate. The upper bearings are housed in a protective bonnet and may be sealed from access of water. The upper bearings are easily accessible through a removable bonnet cover. The vertical position of the leaf within the frame is adjustable by means of a rotatable threaded member reacting against a mating member above the frame.

8 Claims, 4 Drawing Figures

ADJUSTABLE BEARING STRUCTURE FOR BUTTERFLY GATE VALVES

BRIEF SUMMARY OF THE INVENTION

Butterfly gate valves are used to control the flow of water in treatment, waste water plants and the like. They generally comprise a heavy plate which in one position closes the aperture and which is rotatable about a central vertical axis to any desired degree up to full open wherein the plane of the gate is at 90° to its full closed position. Such gates are often very large, e.g. from three to fifteen feet square, and they may weigh some 20,000 pounds.

Presently existing butterfly gates are provided with stub shafts projecting from the top and bottom of the leaf. Since these gates are usually mounted within a concrete conduit, removal and replacement of the bottom stub shaft and replacement of the bottom bearing structure present great difficulties. After installation it is usually necessary to make small adjustments, up to about one inch, in vertical location of the leaf within the frame. Adjustment of the vertical position of the leaf must be made at the bottom so that it is necessary to provide an access recess underneath the gate. If this is not provided, concrete or other construction material must be removed in order to gain access or the entire gate must be removed. All these factors make for great inconvenience and expense whenever repairs or adjustment are required.

With the above considerations in mind, it is the principal object of the present invention to provide a butterfly gate having a one-piece shaft with a vertically adjustable thrust bearing at the top and having only a radial bearing at the bottom. Thus, the vertical position of the entire leaf may be adjusted by means which are readily accessible and the thrust bearing may be replaced without removing the leaf and in fact the entire leaf may be easily removed or replaced by withdrawing the shaft from above.

BRIEF DESCRIPTION OF THE SEVERAL FIGURES OF THE DRAWING

DETAILED DESCRIPTION

Figure 1:
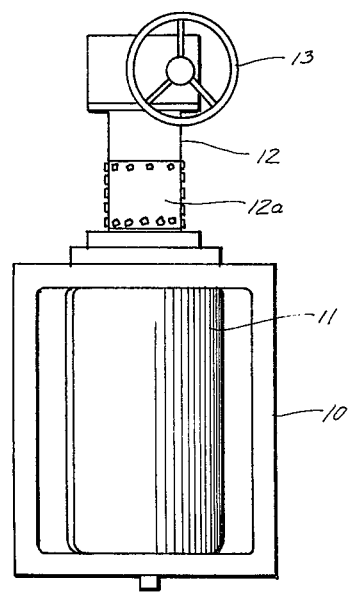
FIG. 1 is an elevational view of a typical butterfly gate valve.

A typical butterfly gate valve is generally illustrated in FIG. 1. It comprises a frame 10 and a leaf 11, the bonnet 12, and the control wheel 13 by means of which the valve is operated. The valve in FIG. 1 is shown with the leaf partially open.

As indicated above, since the frame 10 is generally embedded in a concrete conduit, access to the bearing below the leaf is very difficult. According to the present invention, however, the only element which is below the leaf is a radial bearing which does not require access for adjustment at the time of installation. A radial bearing and a vertical thrust bearing are provided above the leaf, and adjustment means for the vertical position of the leaf are provided in association with the thrust bearing.

Figure 3:
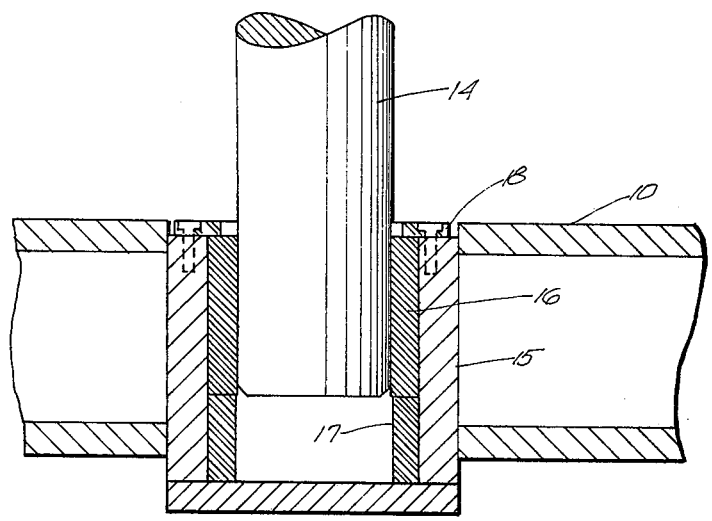
FIG. 3 is a cross sectional view through the lower radial bearing.

According to the present invention, the valve has a single shaft 14 which extends all the way through the leaf 11 and projects above and below the leaf. As best seen in FIG. 3, the lower end of the shaft has a bearing in a box 15 wherein a radial sleeve bearing 16 rests on a spacing collar 17. A retainer is provided at 18 for the radial bearing 16.

Above the leaf 11 there is provided a bearing housing 50 which is welded to the frame 10. The bearing housing 50 has a bottom retainer 19 secured thereto by screws 19a upon which rests a radial sleeve bearing 20 and above that a spacing collar 21. Above the collar 21 there is provided a packing 22 and a packing retainer 23 is held to the bearing housing 50 by means of bolts 24.

A sleeve 25 may be welded to or be integral with the bearing housing 50 and secured to the inside of the sleeve 25 is an internally threaded nut 26.

Secured to the shaft 14 is a thrust collar 27 having upper and lower bearing rings 28a and 28. The thrust collar 27 transfers the weight of the leaf 11 and the shaft 14 through the lower bearing ring 28 to an adjusting ring 29 which has external threads 30 in engagement with the internally threaded nut 26, which in turn transfers this weight to the frame 10 through the sleeve 25 and bearing housing 50. A bearing cap 31 is secured to the adjusting ring 29 by means of cap screws 32 to transfer any uplift from the shaft 14 to the frame 10 through the thrust collar 27, upper bearing ring 28a, and from there to the frame through the path just described. If there is no need to provide against uplift, the upper flange of the bearing cap 31, screws 32 and upper bearing ring 28a can be omitted.

The adjusting ring 29 is provided with holes 33 for a spanner wrench so that the member 29 may be rotated. When the member 29 is rotated, the coaction between the threads 26 and 30 will cause the member 29 to be raised or lowered, depending upon the direction of rotation. The weight of the leaf is carried on the shaft 14 through the collar 27 and lower bearing ring 28 on the member 29. Thus, by raising or lowering the member 29, the vertical position of the leaf is adjusted; and when so adjusted, may be fixed by means of the set screw 32a.

The bonnet 12 is provided with a removable cover 12a so that access may be had to the bearing structure just described.

Figure 2:
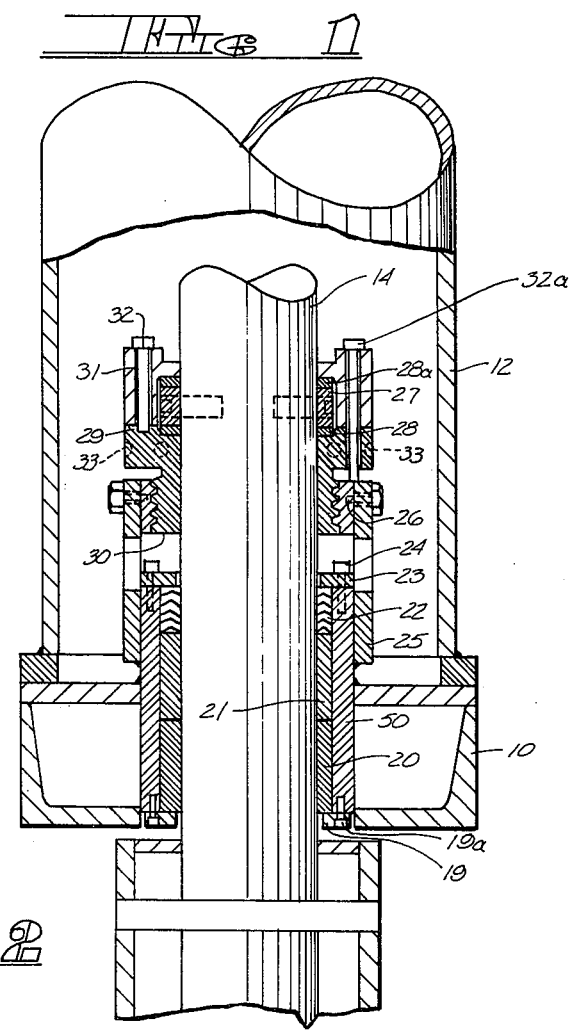
FIG. 2 is a fragmentary detailed cross section of the structure including the upper radial bearing and thrust bearing.

In the embodiment of FIG. 2 it will be seen that both the upper radial bearing and the thrust bearing are within the bonnet where ready access may be had thereto. The thrust bearing and inside of bonnet are sealed from access of water from below. When there is no head of water above the top of the frame 10, the packing 22, packing retainer 23 and the bolts 24 may be omitted. There may be other conditions also, where it is unnecessary to seal out water. The sealing is, however, beneficial in protection of the lubricant on the thread surfaces of the adjusting members 26 and 30, and the bearing surfaces of the members 20, 27, 28 and 28a, by preventing the scouring action of flowing water which is often laden with abrasive particles. The seal is useful in the operation of the gate under the usual submerged conditions.

Figure 4:
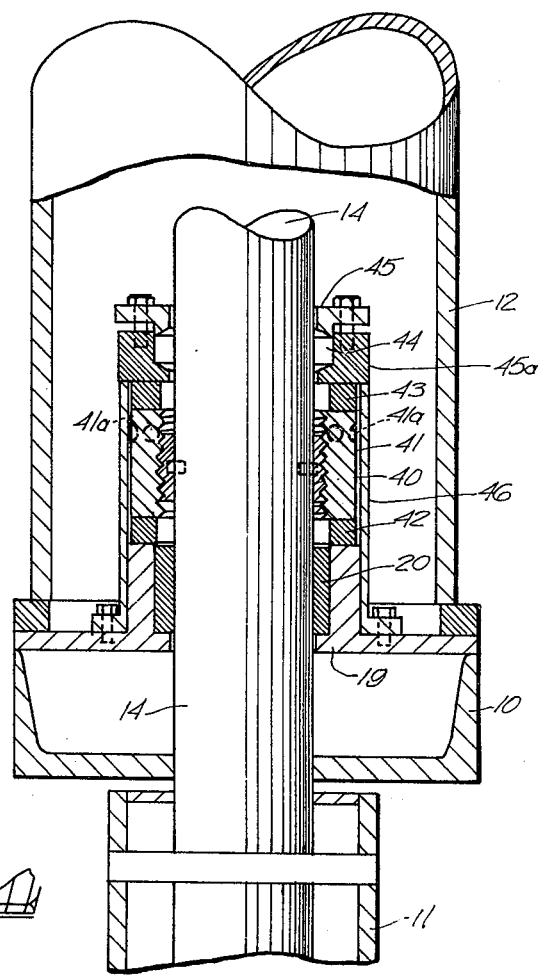
FIG. 4 is a view similar to FIG. 2 showing another embodiment of the invention.

In FIG. 4 there is shown a modification of the invention and in FIG. 4 the same reference numerals are applied to like parts as in FIG. 2. In the embodiment of FIG. 4, the seal against water is above the thrust bearing. Again a radial bearing is provided at 20 but in this instance an externally threaded collar 40 is secured to the shaft 14. The adjusting ring 41, which is internally threaded, operates between a lower thrust bearing ring 42 and an upper thrust bearing ring 43. In this embodiment, a packing is provided at 44 and a packing gland 45 fastened to the stuffing box 45a. Again the member 41 is rotated by inserting a spanner wrench into the sockets 41a therein, thereby performing the function of raising and lowering the shaft 14 and thus the leaf 11. This, of course, is done before the member 46 is secured in place.

The several bearings employed in the structure may be of self-lubricating, graphite inpregnated bronze, or they may be non-metallic, oil impregnated or roller bearings. The specific bearings form no part of the present invention.

While two specific embodiments have been disclosed, it will be understood that many modifications may be made without departing from the spirit of the invention. Therefore, no limitation not expressly set forth in the claims is intended and no such limitation should be implied.

The embodiments of the invention in which an exclusive property or privilege is claimed are defined as follows:

1. In a butterfly gate structure adapted to be mounted in an aperture in a conduit or the like, a leaf having a central vertical shaft extending thereabove and therebelow, a radial bearing for the lower end of said shaft, a radial bearing and a vertical thrust bearing for the upper portion of said shaft, said thrust bearing carrying the entire weight of said leaf and shaft, means associated with said vertical thrust bearing for adjusting the vertical position of said leaf, and a bonnet covering and protecting said upper radial and thrust bearings and adjusting means.

2. The structure of claim 1, wherein a sealing structure is provided for the upper radial and thrust bearings and adjusting means, within said bonnet.

3. The structure of claim 1, wherein said lower radial bearing is unsealed and said thrust bearing is disposed above the sealing structure for the upper portion of said shaft.

4. In a butterfly gate structure adapted to be mounted in an aperture in a conduit or the like, a leaf having a central vertical shaft extending thereabove and therebelow, a radial bearing for the lower end of said shaft, a radial bearing and a vertical thrust bearing for the upper portion of said shaft, said thrust bearing carrying the entire weight of said leaf and shaft, means associated with said vertical thrust bearing for adjusting the vertical position of said leaf, and a bonnet covering and protecting said upper radial and thrust bearings and adjusting means, a bearing collar having a lower thrust bearing ring secured to said shaft, and a bearing cap embracing said bearing collar and bearing against said ring, said adjusting means comprising a fixed sleeve having an internally threaded portion, and an externally threaded adjusting ring secured to said bearing cap and cooperating with said internally threaded portion, whereby rotation of said bearing cap adjusts the vertical position of said shaft.

5. In a butterfly gate structure adapted to be mounted in an aperture in a conduit or the like, a leaf having a central vertical shaft extending thereabove and therebelow, a radial bearing for the lower end of said shaft, a radical bearing and a vertical thrust bearing for the upper portion of said shaft, said thrust bearing carrying the entire weight of said leaf and shaft, means associated with said vertical thrust bearing for adjusting the vertical position of said leaf, and a bonnet covering and protecting said upper radial and thrust bearings and adjusting means, a set screw in said bearing cap engageable with said fixed sleeve to fix said thrust bearing in a desired position of adjustment.

6. In a butterfly gate structure adapted to be mounted in an aperture in a conduit or the like, a leaf having a central vertical shaft extending thereabove and therebelow, a radial bearing for the lower end of said shaft, a radial bearing and a vertical thrust bearing for the upper portion of said shaft, said thrust bearing carrying the entire weight of said leaf and shaft, means associated with said vertical thrust bearing for adjusting the vertical position of said leaf, and a bonnet covering and protecting said upper radial and thrust bearings and adjusting means, a bearing collar having upper and lower thrust bearing rings secured to said shaft, and a bearing cap embracing said bearing collar and bearing against said rings, amd said adjusting means comprising a fixed sleeve having an internally threaded portion, and an externally threaded adjusting ring secured to said bearing cap and cooperating with said internally threaded portion, whereby rotation of said bearing cap adjusts the vertical position of said shaft.

7. The structure of claim 6, wherein a set screw is provided in said bearing cap and is engageable with said fixed sleeve to fix said thrust bearing in a desired position of adjustment.

8. In a butterfly gate structure adapted to be mounted in an aperture in a conduit or the like, a leaf having a central vertical shaft extending thereabove and therebelow, a radial bearing for the lower end of said shaft, a radial bearing and a vertical thrust bearing for the upper portion of said shaft, said thrust bearing carrying the entire weight of said leaf and shaft, means associated with said vertical thrust bearing for adjusting the vertical position of said leaf, and a bonnet covering and protecting said upper radial and thrust bearings and adjusting means, a bearing housing, wherein an externally threaded collar is secured to said shaft and cooperates with an internally threaded adjusting ring, said adjusting ring having upper and lower bearing faces, the lower bearing face resting on said bearing housing, and a sealing structure resting on the upper bearing face.

* * * * *